Dec. 4, 1962 G. M. STOUT ET AL 3,067,305
PULSE OPERATED MAGNETICALLY LATCHING RELAY
Filed May 28, 1959 3 Sheets-Sheet 1

INVENTORS
GLENN M. STOUT
FRED W. TEMPLE
BY Williamson, Schroeder,
+ Palmatier
ATTORNEYS

United States Patent Office 3,067,305
Patented Dec. 4, 1962

3,067,305
PULSE OPERATED MAGNETICALLY
LATCHING RELAY
Glenn M. Stout, 5605 Golden Valley Road, and Fred W.
Temple, 2407 Pleasant Ave. S., both of Minneapolis,
Minn.
Filed May 28, 1959, Ser. No. 816,631
11 Claims. (Cl. 200—93)

This invention relates to a polarized relay and more particularly relates to a latching-type operated relay.

This application is related to applicants' co-pending application filed of even date herewith and entitled Magnetic Device, Ser. No. 816,627.

The present invention provides improvements in many respects to conventional relays. The present relay employs a permanent magnet, which is highly resistive to demagnetizing influences, for providing magnetic latching of the armature in different positions, and because no armature return springs are required, all of the holding power of the permanent magnet is made available for increasing the contact pressure and for resisting shock, vibration and reducing contact bounce. In spite of the far above normal contact pressures, no sacrifice is made to sensitivity.

The present relay may be operated equally well by alternating current of any commercial frequency, or by short pulses of direct current and over a wide range of voltages, and because the time during which the coil is energized is extremely short for each operation, the relay may be safely operated at many times the minimum voltage required to eliminate operational failure due to momentary under voltage, heat loss or power dissipation is extremely low and no provision for heat control or cooling is necessary when the relay is enclosed, a low impedance coil may be used to increase speed of operation of the armature and to materially decrease the incidence of failure due to electrochemical erosion caused by high humidity.

The objects and advantages set forth, along with others, will more fully appear from the following description made in connection wtih the accompanying drawings wherein like reference characters refer to the same or similar parts throughout the several views and in which.

In general the present invention relates to relays or similar devices which operate at very high speed and in response to a relatively low amplitude, low power exciting signal, and furthermore the relays have a high degree of immunity to shock vibration. The immunity to shock and vibration is to a great extent due to the construction of the relay whereby the armature is of low inertia and is statically and dynamically balanced to a high degree. The construction of the relay which generally provides these characteristics are the mounting of the elongate armature relay for pivoting about its longitudinal axis. The projections on the armatures are short and this is facilitated through the use of the permanent magnet which is polarized through its thinnest dimension. Furthermore, the characteristics of the present invention facilitate utilization of the pole tips of the magnetic circuit as electrical terminals which close and open as the relay armature is moved. Furthermore it is pointed out that the present invention also comprises a bi-state information storage device which may be interrogated to determine the position of the armature with respect to the stator.

The relay indicated in general by numeral 9, includes a permanent magnet which is indicated in general by the numeral 10 and which is constructed of a generally rectangular block of electrically insulating ceramic permanent magnet material which has a permeability of the order of air or more specifically has a permeability of approximately 1.2. This material is known to persons skilled in the art, and is sold commercially under a number of trademarks. The ceramic permanent magnet material is polarized through its thinnest dimension so as to orient the north and south poles thereof at the surfaces 11a and 11b which have the greatest area as compared to the other surfaces of the block. The ceramic permanent magnet material is capable of withstanding demagnetizing influences of substantially all types including shock and the effects of oppositely polarized magnetic fields in close proximity therewith.

The relay 9 also includes pole piece means magnetically coupled with the magnetic poles of the ceramic permanent magnet 11, and in the form shown, the pole piece means include a pair of pole pieces 12 and 13 which are flat mild steel plates having a permeability of the order of iron and are laid against the surfaces 11a and 11b of block 11. The elongate pole pieces 12 and 13 each have a pair of engagement portions or upstanding arms 12a and 12b, and 13a and 13b at the opposite ends thereof and oriented in spaced opposed relation with arms of the opposite pole piece.

A frame structure is provided for the relay to hold the block 11 and pole pieces 12 and 13 in the predetermined relation with respect to each other. In the form shown, the frame structure is constructed of non-magnetic material, which is preferably an electrical insulator such as rigid nylon sheet material. The frame structure includes a pair of side plates 14 and 15 which overlie the pole pieces 12 and 13 respectively, and a pair of end plates 16 and 17 which bear against the end surfaces of the ceramic block 11. The pole pieces 12 and 13 have positioning lugs 12c and 13c which fit into recesses in the end plates as at 16a, and the side plates 14 and 15 have outwardly projecting ears 14a and 15a which engage and retain corresponding outwardly projecting ears 16b and 17b on the end plates 16 and 17 respectively and thereby hold the end plates in the proper positions. The ceramic permanent magnet 11, the pole pieces 12 and 13 and the side plates 14 and 15 are apertured as at 18 to receive a securing bolt 19 therethrough for clamping the side plates together and holding all of the other pieces in the predetermined relation. Bolt 19 is preferably electrically insulated from pole pieces 12 and 13 as by fiber washers (not shown).

Figure 1:
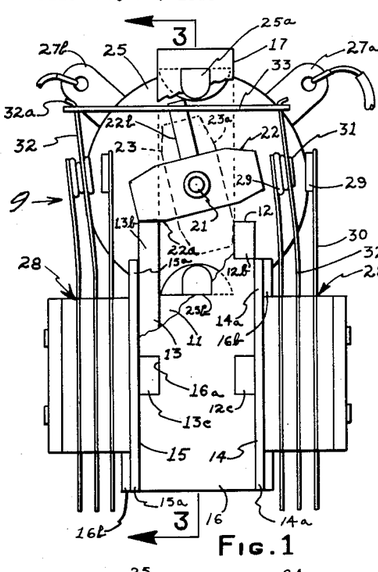
FIG. 1 is an end elevation view, partly broken away, and showing one form of the relay at approximately three times full scale.
Figure 4:
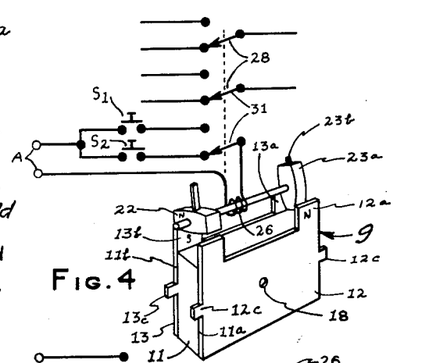
FIG. 4 is a diagrammatic view of the relay showing the contact connections for alternating current operation.

An armature, indicated in general by numeral 20 includes a shaft 21 which is constructed of magnetic material having a permeability of the order of iron, and in the form shown, is constructed of mild steel. Shaft 21 has rotary bearing portions 21a on the opposite ends thereof which are mounted in bearing apertures 16c and 17c of the end plates 16 and 18 to permit rotatable oscillation of shaft 21 about its longitudinal axis. In this form of the relay, the shaft 21 is continuous and the end portions 21b are integral with each other. The armature 20 also has a pair of elongate armature end members 22 and 23 of magnetic material with a permeability of the order of iron, non-rotatably affixed on the end portions 21b of shaft 21. The elongate end members 22 and 23 extend transversely outwardly from the shaft 21 and are oriented transversely with respect to each other, as best seen in FIGS. 1 and 4, and in the form shown, the elongate end members are oriented at approximately ninety degrees with each other. One end member 23 extends downwardly between the arms 12a and 13a of the pole pieces 12 and 13 for selectively and alternately engaging the arms. The other end member 22 has its opposite end portions overlying the upper ends of the pole piece arms 12b and 13b for individually and alternately engaging the same, and for engaging the arm of the pole piece opposite to that which is engaged by the end member 23. When the armature end member 22 engages pole piece 13, the armature end member 23 engages the pole piece 12. When the armature 20 is rotated slightly about the axis which extends longitudinally through the shank 21, the armature end members 22 and 23 will engage the pole pieces 12 and 13 respectively. The armature end members 22 and 23 have flat and straight side surfaces 22a and 23a for engaging over a maximum of area, the pole piece arms.

A controllable source of magnetomotive force is coupled with the armature 20 between the end members 22 and 23 thereof, and more specifically the relay is provided with an actuating coil 26 for controlling the polarity of the magnetic field in the armature 20. The actuating coil 26 is wound on a spool 25, the cylindrical core of which encompasses the intermediate portion 21c of the shaft 21, and the coil 26 is thereby magnetically coupled with shaft 21. Projections 25a are fixed to the end flanges of the spool 25 and extend outwardly therefrom in an endwise direction and have reduced outer ends 25b which extend through apertures 16d and 17d in the end members 16 and 17 for holding the actuating coil in predetermined relation with respect to the armature 20. The ends of the coil winding are connected to the lugs 27a and 27b to facilitate soldering or otherwise connecting of an electrical circuit thereto.

The relay 9 is adapted to perform switching operations in an electric circuit and in this form of the relay, contact means comprising a number of "C" type contact stacks indicated by the numeral 28, are affixed to the side plates 14 and 15 as by the screws 29. It will be noted that each of the contact stacks 28 has a pair of substantially stationary contacts 29 mounted on leaf springs 30 and a movable contact 31 also mounted on a leaf spring 32.

Means are provided for connecting the movable contacts with the armature 20 for operating the contacts when the armature is rotated. In the form shown, such means include upstanding projections 22b and 23b which are formed integrally with corresponding armature end members 22 and 23. The projections 22b and 23b are connected to the movable contacts by means of rigid insulated links 33 which are apertured to receive the projections 22b and 23b therethrough and which are also apertured to receive the diminished upper ends 32a of leaf springs 32 therethrough.

As will be seen in connection with other disclosed forms of the relay, the switching function may be accomplished by other means, such as by the conductive armature engaging the conductive pole pieces.

When the relay is to be used in connection with an alternating current source A, as seen in FIG. 4, one end of the coil winding is connected to one side of the source and the other end of the coil winding is connected to the movable contact 31 of one "C" type stack 28a. The stationary contacts of the stack 28a are connected through individual switching devices such as the hand operated switch buttons $S_1$ and $S_2$ respectively, to the other side of the source A. The remainder of the contact stacks 28 are available for other circuit switching operations which are to be operated by the relay.

Figure 5:
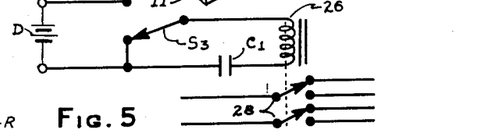
FIG. 5 is a schematic view showing a circuit connection for operating the relay from a direct current source.

When the relay is to be connected for operation from a direct current power source D as seen in FIG. 5, the coil 26 may have one side connected to a condenser $C_1$ and the other side of the condenser $C_1$ is connected to one side of the power source D. The other end of the coil winding may be connected to a single pole double throw switching device $S_3$, and the stationary contacts of the switching device are respectively connected to the opposite sides of the power source D. All of the contact stacks 28 are available for circuit control purposes. In this circuit, the relay may be operated twice for each pulse of energy supplied from the source. First the relay will be operated when the condenser $C_1$ is charged, and then when switch $S_3$ is operated, the relay is operated again by discharging of the condenser.

Figure 6:
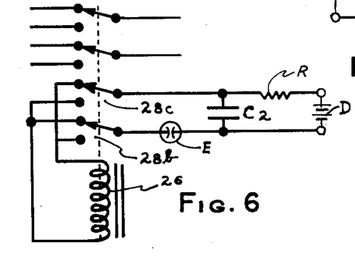
FIG. 6 is a schematic view showing the circuit connection for the relay operating as a timed periodically operating switching device.

When the relay is to be used for periodically switching the contacts from one position to another, the relay may be connected as shown in FIG. 6, wherein one side of the coil 26 is connected to a stationary contact in each of a pair of contact stacks 28b and 28c, and the other side of the coil is connected to the other stationary contacts. The movable contact of stack 28c is connected through a resistor R to one side of the direct current power source D and the other movable contact of stack 28b is connected to the other side of the power source through a voltage responsive discharge device such as neon bulb E. A condenser $C_2$ is connected between the shiftable contact of stack 28c and the other side of the power source D to be charged through the resistor R.

In the use and operation of the relay, the armature will normally be oriented so that the end members 22 and 23 thereof are in engagement with one or the other of the pole pieces 12 and 13. It will be noted that because the armature end members 22 and 23 are symmetrically formed about the axis of the shank 21, the armature is in static and dynamic balance. The movable contacts 31 are each held against a corresponding stationary contact with a very substantial contact pressure because the armature end members are in physical engagement with the pole piece arms. A substantial portion of the magnetic field of the permanent magnet ceramic block 11 is concentrated in the pole piece arms because the armature completes the magnetic circuit between the pole pieces. The holding power of the permanent magnet is excessive of that required to offset the contact pressure, and the remainder of the holding power is utilized to resist shock forces and vibration tending to move the contacts.

If it is assumed that the armature is in the position shown in FIGS. 1–4, and that the pole piece 12 has a north polarity and the pole piece 13 has a south polarity, a magnetic field induced by current flowing in the coil 26 into the armature 20 in such a direction as to produce a north pole at the end member 22 and a south pole at the end member 23, will have no effect to move the armature because the end members 22 and 23 are attracted to the pole piece arms 13b and 12a respectively which are already engaged by these corresponding end members. However, if a pulse of current is applied to the coil 26 in the other direction, north and south poles are produced in the end members 23 and 22 respectively, and a repelling force is established between these end members and the pole piece arms 12a and 13b respectively. The repelling force and the stored energy of stressed contact springs or other means results in application of torque to the armature causing rotation of the armature in a clockwise direction as seen in FIG. 1. Simultaneously, an attraction force is established between the end members 22 and 23 and the pole piece arms 12b and 13a respectively, and this attracting force also tends to produce rotation of the armature. After the armature is set in motion and completes substantially fifty percent of its total rotary travel (which total travel is approximately thirty degrees) further movement of the armature is no longer dependent upon existence of magnetic field in the armature produced by the current in the coil. The inertial motion of the armature will carry it beyond the half-way point of rotary travel and the strong attractive force previously mentioned continues to move the armature until the end members 22 and 23 engage the pole piece arms 12b and 13a respectively. When engagement of the end members is effected, the strong zero gap force between the pole pieces and the armature effects a magnetic latching. It should be understood that application of the current in the coil may be continued until the armature end members have completely shifted, but this is not necessary.

As the armature rotates through the approximately thirty degree arc, the projections 22b and 23b also swing to move the links 33 which move the movable contacts 31 into their reversed position.

Another important aspect of the relay which affects and improves the operation thereof, is the use of the ceramic permanent magnet 11 which has a permeability of the order of air. The remainder of the magnetic circuit, including the pole pieces 12 and 13 and the armature 20 are all constructed of magnetic material having a permeability of the order of iron. Because of the low permeability of the permanent magnet 11, the magnet effectively introduces an air gap into the magnetic circuit, which is equal in length to the thickness of the magnet 11, or more specifically the distance between the pole pieces 12 and 13. Because an air gap of substantial length already exists in the magnetic circuit, the opening of another air gap in the magnetic circuit, of substantially shorter length than the thickness of the magnet 11, by movement of the armature end members away from the pole piece arms, causes only a small change in the total lines of magnetic flux passing between the armature end members and pole piece arms. As a result, the force exerted on the armature is not materially reduced upon the opening of an air gap.

The fact that there is only a relatively small reduction in force on the armature upon the opening of an air gap is important in the present relay in several respects. In one example, assume that the armature is in the position shown in FIGS. 1–3 and there is no current flowing in the coil. If any shock or vibration forces are exerted on the relay which might tend to move the contacts and connecting bar 33 to the right, so as to tend to cause rotation of the armature in clockwise direction, the force on the armature tending to hold it in the position shown remains substantially unchanged even if a minute air gap is opened because there will be substantially no change of magnetic flux density at the pole piece-engaging surfaces of the armature end members. This is in distinct contrast to the situation that would exist if the permanent magnet 11 had a permeability of the order of iron instead of having a permeability of the order of air. In the present relay the percentage change in length of air gap in the magnetic circuit is only minute, whereas if a magnet having the permeability of iron were used the percentage change in length of air gap is exceedingly great even if only a minute air gap is opened and therefore the change in flux density would be exceedingly great with a proportionate change in the forces exerted on the armature.

As another example, assume that the coil has been energized so as to cause rotation of the armature to a position wherein the armature end members 22 and 23 are approaching the pole piece arms 12b and 13a respectively and are under the influence of attracting forces tending to cause completion of the movement of the armature. Even though the air gaps between the end members 22 and 23 and the pole piece arms 12b and 13a respectively still exist, the forces exerted on the armature end members are extremely high and very nearly approximate the forces exerted on the armature end members after they actually engage these pole piece arms. It will therefore be seen that the armature end members engage the pole piece arms with an impact of considerable magnitude so that the armature end members and pole piece arms effectively perform a peening operation on each other so that after a number of operations, the surfaces of the armature end members and pole piece arms are contoured in identical fitting relation to thereby cause engagement of a minimum of surface area. Furthermore, the high force exerted on the armature as the end members are approaching the pole piece arms, may be utilized in operating spring contacts which require substantial stressing. Furthermore, it should be recognized that for the reasons set forth in the previous paragraph there is little likelihood of any bouncing of the armature or of the contacts after the end members engage the pole piece arms.

In addition, assume the condition of a pulse being applied to the coil to establish repelling forces between the armature end members and pole piece arms and assume that the armature end members 22 and 23 are leaving the pole piece arms 13b and 12a respectively. The repelling forces exerted on the armature are of greatest magnitude while the end members remain in engagement with the pole piece arms, but it should be particularly noted that because the permanent magnet 11 has already effectively created an air gap in the magnetic circuit, the opening of small air gaps at the armature end members, produces only a small change in total air gap length and therefore the forces exerted on the armature end members are not materially decreased as the armature end members move away from the pole piece arms.

These concepts are common to all of the forms of the relays which are described in connection with the remaining figures in the drawings.

It should be understood that because of the extremely short time duration of the pulses necessary to operate the relay, and because the coil can be of low impedance, there is substantially no heat produced by current flowing in the coil. Only a fraction of a watt-second is consumed for each operation. Power may be completely removed from the coil between operations. Therefore in use, the relay may be confined within a small enclosure and no provision need be made for dissipation of heat or for controlling heat produced. Furthermore, changes in ambient temperature have substantially no effect on the operation of the relay at least up to class "H" operation. Because a low impedance coil is preferred in the relay, relatively large wire size will be used, and because the effect of humidity to cause electrochemical erosion of wire is substantially less pronounced on wire of large diameter than on fine wire, the potential failure of the relay due to action of humidity is extremelyl low. Furthermore, because the relay is only periodically energized, there is no continuing potential between the coil and ground and therefore galvanic action due to humidity and which eventually leads to coil failure is maintained at an absolute minimum.

The present relay may be safely operated at many times the minimum voltage required to energize the coil so that operation of the armature will result, and therefore it will be seen that even though the power source to which the relay is connected may have a momentary low voltage, the relay will not fail to operate. As an example, a test relay with a thirteen ohm coil operated and completed shifting of its contacts approximately 8 milliseconds after application of twelve volts D.C.; and also operated and completed shifting of its contacts approximately four milliseconds after application of twenty-five volts D.C.; and a relay with the same 13 ohm coil was successfully and reliably operated by a 40 microsecond pulse from a three microfarad condenser charged to one hundred twenty volts. It will therefore be seen that the present relay may be used in a very wide range of applications and can be made to operate reliably on nearly any kind of power supply and control circuit, regardless of whether the power supply is alternating current or direct current.

The relay 9 is capable of locking the armature in a position in response to sudden application of a high magnitude current flowing in a direction such that if the magnitude of the current were lower, repelling forces would be created in the armature end members causing the armature to move. It will be readily understood that when no current flux is in the coil, the permanent magnet 11 produces at the pole piece arms which engage the armature end members, magnetic field intensities of predetermined magnitudes such as X oerstads. If the current in the coil produces a magnetic field in the armature which opposes the magnetic field from the permanent magnet, the armature end members will be repelled from the pole piece arms when the magnetic field intensity therein approaches in magnitude the magnetic field intensity in the pole piece arms. However, if the magnetic field produced by current flowing in the coil has such a magnetomotive force as to suddenly produce in the armature end members, magnetic field intensities (such as 2X oerstads) which overcome the magnetic field intensities in the pole piece arms, the armature is locked in position and the magnetic circuit of the field produced by the coil is completed through the armature end members and the pole piece arms engaged thereby and the leakage flux paths between the pole pieces 12 and 13. Under these operating conditions, the high current in the coil must be continuously maintained in order to hold the armature in the locked position. It should also be noted that due to these characteristics, the relay may be considered as a discriminating device so as to produce operation of the relay at one magnitude of current and to preclude operation of the relay at a higher magnitude of current applied to the coil.

In the simple example of the relay connected for D.C. operation in FIG. 5, the relay will operate each time the switch $S_3$ is operated. When the switch $S_3$ is in the position shown, the condenser $C_1$ will have discharged through the coil 26 and through the switch. When the switch is moved to the other position, a pulse of current flows through the switch and coil until the condenser $C_1$ is charged, and assuming that the current flows in the proper direction as to create a properly polarized magnetic field in the armature as to cause the end members 22 and 23 to be repelled from the pole piece arms engaged thereby, the pulse of current will effect shifting of the armature and of the contacts. When the condenser $C_1$ is charged, current flow in the coil will cease and there will be no additional losses in the coil. When the switch $S_3$ is moved back to the position shown in FIG. 5, the coil 26 is disconnected from the power source and the condenser $C_1$ is allowed to discharge through the coil and switch $S_3$ whereby to cause a pulse of current to flow in the opposite direction, relative to the charging of condenser $C_1$, and thereby effect shifting of the armature and contacts again.

When the relay is connected to alternating current source as shown in FIG. 4, closing of switch $S_1$ has no effect. However, if switch $S_2$ is closed, power is supplied to the coil 26 through the shiftable contact 31 and current flows in the coil until the proper half cycle polarizes the armature in such a direction as to influence it to move to its other position, whereupon the contact 31 shifts to the other position and power is removed from the coil 26. The armature will remain in the new position until the other switching device $S_1$ is subsequently closed. It will be seen that the relay is thereby well adapted for use in synchronizing switching with predetermined half cycles of the alternating current source. It has been found that the relay may be operated equally well by any alternating current source of commercial frequency, 60 c.p.s. to 1000 c.p.s.

When the direct current power is supplied in the manner shown in FIG. 6, the bulb E normally prevents current flow therethrough and the condenser $C_2$ will charge through resistor R. As the condenser $C_2$ charges, the voltage applied across the bulb E is increased. When the voltage across bulb E reaches a predetermined level, conduction commences through the bulb to apply a pulse of current to the coil 26. If the current flow is in the proper direction so as to produce a magnetic field in the armature of proper polarity the armature shifts to move all of the contacts of the relay. When the contacts 28c and 28b are moved, the voltage across the bulb E is immediately decreased and conduction therethrough ceases. Condenser $C_2$, which has discharged through the bulb E, will immediately start to charge again and when a predetemined voltage is reached again bulb E conducts current to cause operation of the relay again.

In the several different forms of the relay illustrated in FIGS. 7–10 and 12, the frame structure has been eliminated so as to simplify the views so that the different forms which the relay may take can be clearly exemplified. The frame structure disclosed in connection with FIGS. 1 to 3 will be applicable to these forms of the relay with possible minor variations.

Figure 7:
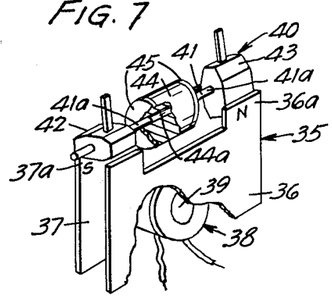
FIG. 7 is a diagrammatic perspective view, partly broken away, of a modified form of a relay, with the frame structure and leaf spring contacts being eliminated in order to show clarity of detail.

The form of the relay shown in FIG. 7 is indicated in general by numeral 35 and employs a pair of pole pieces 36 and 37 which are spaced from each other and which have upwardly projecting pole piece arms or engagement portions 36a and 37a. A variable source of magnetic flux is provided by a coil 38 which has a core 39 of magnetic material with a permeability of the order of iron, the ends of which engage the pole pieces 36 and 37 to be magnetically coupled therewith. The armature 40 has a discontinuous shaft 41 with end portions 41a and 41b in spaced but aligned relation with respect to each other for carrying the armature end members 42 and 43 respectively. The armature 40 also includes a ceramic permanent magnet 44 which, in the form shown, is generally cylindrically shaped and has a central opening 44a which receives the shaft end portions 41a and 41b therein and retains the shaft end portions in aligned, but spaced relation with each other. The armature 40 also has a pair of disc-shaped shoes 45 of ferromagnetic material respectively engaging opposite ends of the permanent magnet 44 at the respective magnetic poles thereof, and the shoes 45 are secured on the shaft end portions to be magnetically coupled therewith.

In this form of the invention, the operation is similar to the form of the invention previously described except that the coil 38 which is stationary with the pole pieces 36 and 37, is energized to cause reversal of the magnetic field polarities in the pole pieces 36 and 37, which cause rotary oscillation of the armature from one position to another position. The operating characteristics of this form of the invention are generally similar to the operating characteristics of the other form of the relay. It should be noted that in this particular construction, the permanent magnet 44 is affixed to the shaft end portions to turn therewith. The permanent magnet 44 imparts a flywheel effect on the armature as the same is moved and further increases the impact of the armature end members on the pole piece arms.

Figure 8:
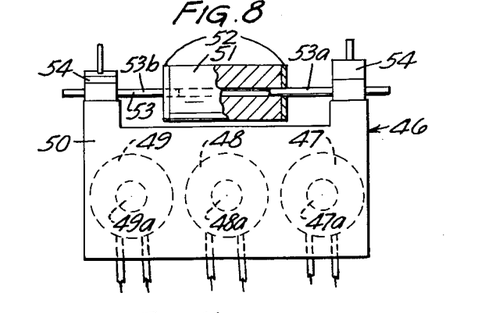
FIG. 8 is a diagrammatic elevation view, partly broken away of another modified form of the relay, with the frame structure and leaf spring contacts being eliminated to show clarity of detail.

The form of the relay shown in FIG. 8 is indicated in general by numeral 46 and is substantially similar to relay 35 in FIG. 7. In this form of the relay a plurality of coils 47, 48 and 49 are provided for controlling the magnetic field polarities of the pole pieces 50. The coils 47–49 have ferromagnetic cores 47a, 48a and 49a which engage the pole pieces. This form of the relay also employs a ceramic permanent magnet 51 coupled with the shoes 52 which are secured on the end portions 53a and 53b of the discontinuous armature shaft 53. The armature end members 54 are affixed on the shaft end portions for engaging the pole piece arms.

The relay 46 may be operated in any of a number of different manners, depending on such factors as the current-carrying capacities of the coils 47–49 and the strength and duration of current pulses which may be applied to the coils. If the coils have sufficient current-carrying capacities, energization of any one of the coils may be sufficient to cause shifting of the armature. It may be that the current pulses applied to any one coil is sufficient to create magnetic field in the pole pieces of such intensities as to cause operation of the armature, in which case two or more coils would necessarily be energized simultaneously to operate the armature. It can be understood that under such operating conditions, the relay 46 may be applied to a wide variety of circuits to be operated in response to certain conditions that may exist in various other circuits. Because a number of coils are provided, the magnetic fields created by the coils may oppose each other, depending upon the direction of current flow in the coil and if the coils oppose each other, their magnetic fields tend to cancel each other out so that operation of the armature may not result. It would be necessary to energize all three of the coils 47–49 in order to cause the armature to operate. It will therefore be seen that this relay 46 is extremely versatile in the manner of operation thereof.

Figure 9:
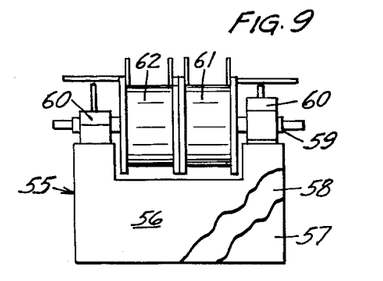
FIG. 9 is an elevation view, partly broken away, of still another form of the relay, with the frame structure and leaf spring contacts being eliminated to show clarity of detail.

The relay 55 shown in FIG. 9 includes pole pieces 56 and 57 which engage and are magnetically coupled with a ceramic permanent magnet 58. The armature shaft 59 is continuous and has armature end members 60 secured on opposite ends thereof for engaging the pole piece arms in a manner identical to that previously described. A variable source of magnetic flux is provided by a pair of coils 61 and 62 which encompass the armature shaft 59 and are disposed in end-to-end relation with each other. This form of the relay is also extremely versatile in operation, and depending upon the capacities of the coils 61 and 62 and the magnitudes of the currents applied thereto, the armature may be caused to shift when only one of the coils is energized or it may be necessary that both the coils 61 and 62 be energized to cause operation of the armature. Even if the magnetic field from one of the coils, such as 61, is sufficient to cause operation of the armature, a magnetic field may be created by current flowing in the coil 62 so as to oppose the field of coil 61 and thereby preclude operation of the armature. Furthermore, it will be understood that the coils 61 and 62 are coupled together by transformer action and that one of the coils may be employed as a read-out coil when the size of the armature shaft 59 is such that the shaft is normally substantially saturated under the influence of the permanent magnet 58.

Figures 10, 12, 13:
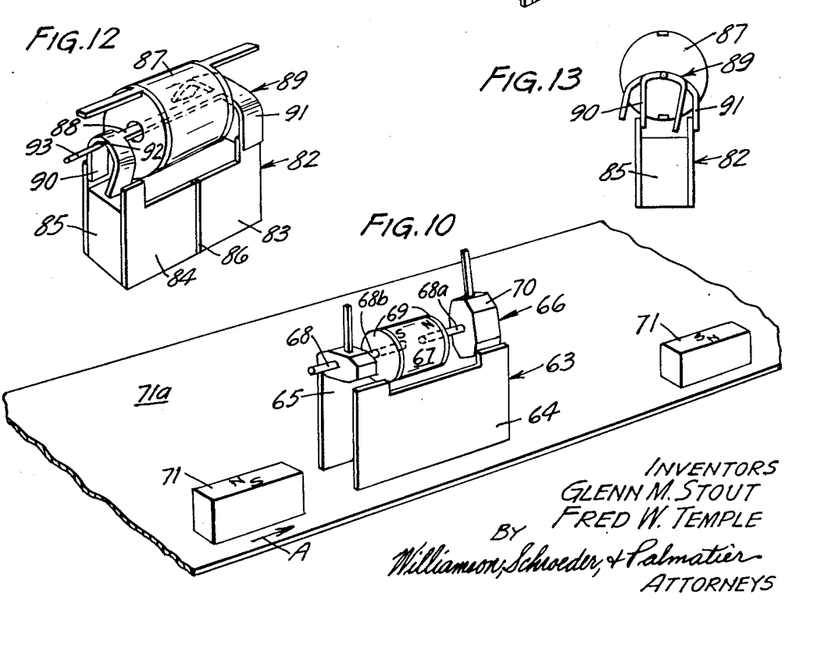
FIG. 10 is a diagrammatic perspective view of still another form of the relay, with the frame structure and leaf spring contacts eliminated to show clarity of detail.
FIG. 12 is a diagrammatic perpsective view of still another form of the relay, operating similar to the form shown in FIG. 11 and having the frame structure eliminated to show clarity of detail.
FIG. 13 is an end elevation view of the relay shown in FIG. 12.

The relay 63 shown in FIG. 10 includes a pair of pole pieces 64 and 65 which are held in stationary relation with respect to each other by any suitable frame structure (not shown) and the armature 66 is provided with a ceramic permanent magnet 67 into which the opposite end portions 68a and 68b of the discontinuous shaft 68 extend. The shaft end portions have shoes 69 secured thereto and engaging the ends of magnet 67 at the magnetic field poles thereof and are thereby coupled with the magnet. The armature end members 70 are secured on the shaft end portions and engage the pole piece arms in a manner previously described. The relay is provided with a variable source of magnetic flux which is embodied by permanent magnets 71 which may be secured on a moving device such as a conveyor belt 71a or the like. The relay 63 is held in such a position that the permanent magnets 71 pass between the pole pieces 64 and 65 when moved in the direction of arrow A so that the magnetic field poles of the permanent magnet pass in proximity with the pole pieces 64 and 65 and are magnetically coupled therewith so as to polarize the pole pieces 64 and 65, and, depending upon the polarity of the magnet 71, cause operation of the armature. In this form of the invention, the importance of the use of a ceramic permanent magnet is emphasized because of the substantially unavoidable air gaps that exist between the magnets 71 and the pole pieces 64 and 65 as the magnet is passing therebetween. As previously described, the ceramic permanent magnet with its permeability of the order of air effectively creates an air gap in the magnetic circuit of the relay and will thereby minimize the effect of other air gaps which exist or are opened in the magnetic circuit. It should be understood that if the permanent magnet 71 is improperly oriented, with relation to the present position of the armature, the armature will not operate. It should further be understood that although only one embodiment of a relay showing a physically moving magnet is shown, that the magnet may be moved in any of a number of manners such as by reciprocation or by swinging movement.

Figure 2:
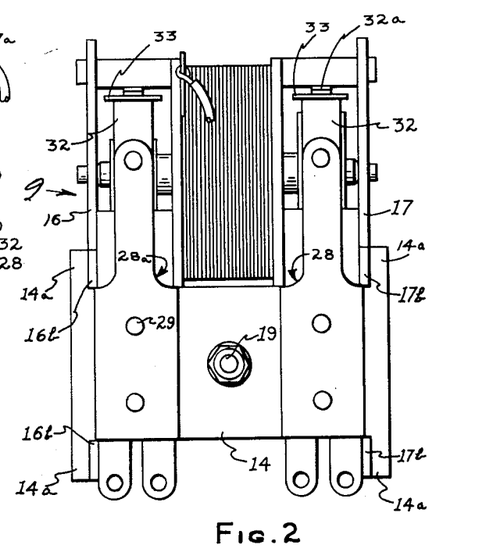
FIG. 2 is a side elevation view of the relay.
Figure 3:
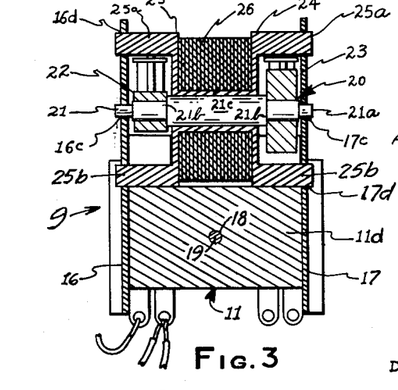
FIG. 3 is a section view at a slightly reduced scale taken on a vertical plane substantially as indicated at 3—3 in FIG. 1.
Figure 11:
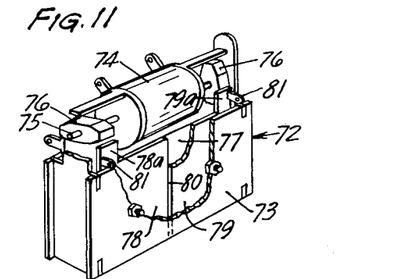
FIG. 11 is a perspective view, partly broken away, of still another modified form of the relay.

The relay 72 shown in FIG. 11 is substantially similar to the relay 9 shown in FIGS. 1–3 and includes an electrically insulating frame structure 73 mounting a coil 74 which encompasses and is magnetically coupled with armature shaft 75 which is rotatably mounted on the frame structure and which carries the armature end members 76. The relay 72 is also provided with an electrically insulating ceramic permanent magnet 77. The relay 72 employs, at each magnetic field pole of the magnet 77, a pair of pole pieces 78 and 79 which are of electrically conductive ferromagnetic material and which are spaced from each other in electrically insulating relation with respect to each other. A strip 80 of insulating material may be provided between the pole pieces 78 and 79 on each side of the magnet 77. The pole pieces 78 and 79 have pole piece arms 78a and 79a for engaging the armature end members 76 in the manner previously described. The pole pieces 78 and 79 are also provided with means adapted for connection with electrical circuits and in the form shown such means comprise tabs 81 which may be formed integrally of the pole piece arms.

In this form of the relay, the armature end members 76 and the pole piece arms form the electrical contacts of the relay. The armature end members 76 and the shaft 75 are of electrically conductive material so that when the armature is in either of its positions, a predetermined pair of pole pieces are electrically interconnected so as to close an electrical circuit.

In this form of the relay, the effect of the air gaps in the magnetic circuit between the pole pieces 78 and 79 is virtually insignificant because these air gaps are extremely smaller as compared to the relatively large air gap provided by the ceramic permanent magnet. The armature end members engage the pole piece arms with a considerable impact for the reasons hereinbefore discussed.

When the armature end members swing to move away from a certain pair of pole piece arms so as to break the electrical circuit established therebetween, the flux density in the air gap which is opened will substantially eliminate any arcing between these parts which serve as electrical contacts and therefore arcing is kept at an absolute minimum. It will further be noted that because the armature end members swing into engagement with the pole piece arms with a considerable impact, any deformations in the surfaces which might be caused by slight arcing such as strings or small globules of metal, are flattened or smoothed out during successive operations of the armature. Furthermore, because the armature end members and pole piece arms engage each other over a large surface area, a large current-carrying capacity is provided even though the armature end members and pole piece arms are constructed of ferromagnetic material which is commonly recognized as having a somewhat smaller current-carrying capacity than materials such as copper or silver.

The relay 82 shown in FIGS. 12 and 13 is similar in construction to relay 72 of FIG. 11 and may have electrically insulated pole pieces 83 and 84 at each magnetic pole of the ceramic permanent magnet 85 and spaced from each other by an insulating strip 86. The relay 82 has a stationary coil 87 encompassing the shaft or shank portion 88 of the armature 89 which is formed in a one-piece construction with the armature end members 90 and 91 formed integrally thereof. The armature 89 is of magnetic material having a permeability of the order of iron and may be formed as by stamping from sheet material. It will be noted that the armature end members engage the side faces of the pole piece arms whereby to provide engagement over a large surface area. The armature end members 90 are shaped to engage the inner side surfaces of the pole piece arms adjacent thereto and the armature end members 91 are shaped to engage the outer side faces of the adjacent pole piece arms. In this form of the invention, the armature 89 may be provided with bearing dimples or recesses 92 at the ends thereof to receive the pointed inner ends of pivot pins 93 which will be mounted on the frame structure (not shown).

The relay 82 has operating characteristics substantially identical to relay 9 and the pole pieces and armature may be utilized as the operating contacts of the relay. The armature 89 may be inexpensively produced by a stamping operation and therefore a material advantage is provided by this form of the relay.

Figure 14:
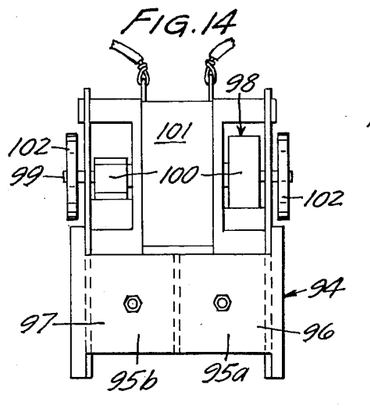
FIG. 14 is a side elevation view of still another form of the relay.

Relay 94, shown in FIG. 14, is substantially identical to the relay 72 shown in FIG. 11 and has electrically insulated pole pieces 95a and 95b held at each side of the ceramic permanent magnet 96 by the frame structure 97. The armature 98 includes a shaft 99 with armature end members 100 thereon and engaging the pole piece arms of opposite magnetic polarity. A coil 101 encompasses the shaft 99 and is secured on the frame structure. In relay 94, circular flywheel discs 102 are affixed on the ends of shaft 99 and are dynamically balanced about the rotation axis of the shaft. The flywheels 102 cause a further increase in the impact between the armature end members and the pole piece arms, and in addition, the speed of movement of the armature is decreased to some extent because the movement of the armature is somewhat slower during the initial stages of travel thereof from one pair of pole piece arms to another pair of pole piece arms.

Figure 15:
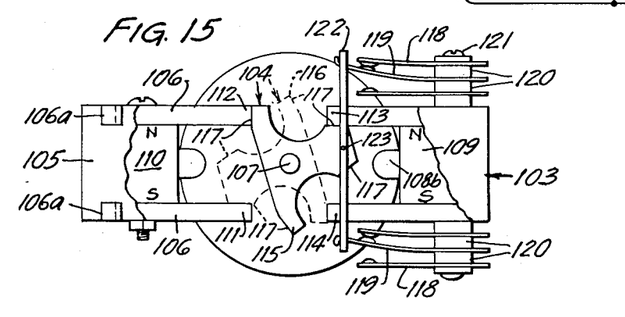
FIG. 15 is a side elevation view of still another form of relay.
Figure 16:
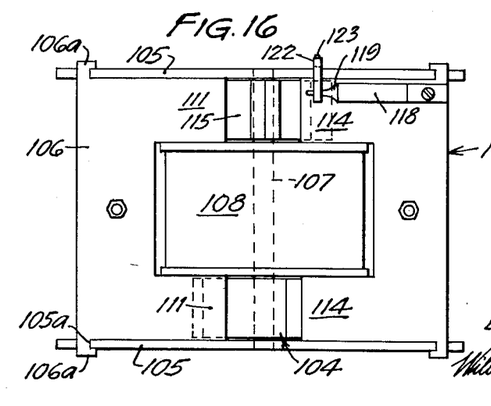
FIG. 16 is a top plan view, partly broken away, of the form of the invention shown in FIG. 15.

The relay 103 shown in FIGS. 15 and 16 is similar to the relay 9, but provides greater power for moving the armature 104 from one position to another. The frame structure includes end plates 105 and also employs the pole pieces 106 for interconnecting the end plates 105 by means of the notched tabs 106a which project through the notches 105a in the end plates. The armature 104 has an armature shaft 107 with its opposite ends journalled in the end plates 105. A coil 108 encompasses the armature shaft intermediate the ends thereof and the coil spool 108a is secured to the end plates 105 by the projections or ears 108b thereon. A pair of ceramic permanent magnets 109 and 110 are secured between the pole pieces and are disposed on opposite sides of the coil 108. The magnets 109 and 110 have the magnetic field pole thereof oriented in the manner shown by the letters N and S in FIG. 16 at the pole pieces 106 engaged thereby. At each end of the coil 108, the pole pieces 106 provide a plurality of pole piece arms 111, 112, 113 and 114, each of which has a magnetic field polarity and each of which is spaced from other pole piece arms of similar and opposite polarities. The armature 104 has end members 115 and 116 which are generally T-shaped and are oppositely oriented on the shaft 107 so that each of the armature end members engages pole piece arms of like polarity, and the armature end members 115 and 116, with respect to each other, engage pole piece arms of opposite polarities. It should be particularly noted that the armature end members have pole piece arm-engaging surfaces 117 which are oriented at the proper angle so as to engage the pole piece arms over a maximum of surface area.

The relay 103 has stationary contacts 118 and movable contacts 119 spaced from each other by insulating strips 120 and secured to the pole pieces as by screws 121. The movable contacts 119 are connected by a rigid, electrically insulating bar 122 to a driving pin 123 which is affixed on the armature end member 115. The end of the leaf springs of movable contacts 119 project through suitably provided apertures in the ends of the bar 122. When the armature 104 is rotated from one position to another, bar 122 is shifted in an endwise direction and the movable contacts are each moved out of engagement with one stationary contact and into engagement with another stationary contact 118.

Figure 17:
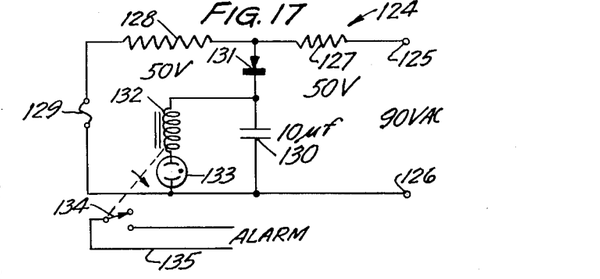
FIGS. 17 and 18 are schematic views showing examples of application of the relay.

In FIG. 17 is shown another circuit which is somewhat typical of the type of circuits in which substantially any of the relays disclosed is applicable. The circuit, indicated in general by numeral 124 is connectible at its terminals 125 and 126 to an A.C. source of power. The circuit includes a pair of substantially equal resistances 127 and 128 in series with each other and also in series with a fusible link 129 which is rupturable upon application of heat at a predetermined temperature, and the fusible link 129 is connected to the other terminal 126. A condenser 130 is connected at one side to the terminal 126 and is connected at the other side to a rectifier 131 which, in turn, is connected between the resistors 127 and 128. The relay coil 132 is connected in series with a gas-filled bulb such as a neon bulb 133 and the series connected coil and bulb are connected in parallel relationship with the condenser 130. The contacts 134 of the relay which is operated upon energization of coil 132 is connected in an alarm circuit for operating the same when the coil 132 is energized. When the A.C. power is applied to the terminals 125 and 126, the voltage drops across the resistors are approximately equal to each other and therefore the condenser 130 will be charged to approximately one-half the line voltage. The bulb 133 will not fire or conduct until substantially more than one-half of the line voltage is applied thereto and when the fusible link 129 opens, the voltage across the condenser 130 increases and approximates the line voltage, at which time the neon bulb fires and causes conduction through the relay coil 132 and also causes discharge of the condenser 130 through the coil 132. When the pulse of current is applied to the coil 132 the contacts 134 shift to close the alarm circuit 135. After the initial pulse of current passes through the coil 132 the voltage drop across the resistor 124 approaches line voltage and substantially no voltage is applied across the neon bulb 133 whereby conduction through the bulb 133 ceases and the coil 132 is deenergized, but as previously seen in connection with the description of the relays, the contacts will remain in shifted position regardless of deenergization of the coil.

Figure 18:
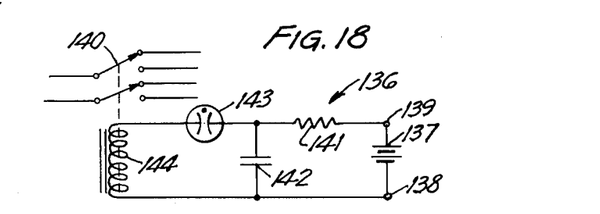

The circuit 136 effects a time delay between the application of a D.C. source 137 across the terminals 138 and 139 and the operation of the relay contacts 140. The circuit 136 includes a resistor 141 connected in series with a condenser 142 across the terminals 138 and 139. A neon bulb 143 is connected in series with the relay coil 144 and the series connected bulb and relay coil are in parallel relation with the condenser 142. When the D.C. source is applied across the terminals, the condenser 142 starts charging and the voltage thereon increases until the firing voltage of the bulb 143 is reached, at which time the bulb 143 conducts and applies a current to the relay coil 144 which effects operation of the contacts 140. After the bulb 143 commences conduction, the condenser discharges therethrough and through the coil 144. When the condenser 142 has substantially completed its discharge, the voltage thereacross decreases and the bulb 143 stops conduction, at which time the voltage across the condenser 142 begins to increase again. When the voltage across the condenser equals the firing voltage of the bulb 143, the bulb fires again causing another pulse of current to be applied to the coil 144. This cycle application of current pulses to the coil 144 continues in the manner described but is ineffective to cause a second operation of the contacts 140 because all of the current pulses pass through the coil in the same direction. However, if the relay contacts and armature have been manually or otherwise moved back to their original position, the contacts 140 will again be operated as previously described.

It will, of course, be understood that various changes may be made in the form, detail, arrangement and proportion of the parts without departing from the scope of our invention which consists of the matter described herein and set forth in the appended claims.

What is claimed is:

1. A magnetic device comprising, in combination, a stator having first and second pole tips spaced apart in a first direction, an elongate armature pivoted for rotation about its longitudinal axis lying transverse to said first direction, said armature having first and second projections spaced apart along said axis and extending radially relative to the axis, said projections being angularly phased about said axis such that as the armature is rotated between two angular positions one projection alternately engages said first and second pole tips and the other projection alternately engages said second and first pole tips, respectively, and a source of magnetomotive force in the inset stator for oppositely polarizing said pole tips, whereby rotation of said armature between said two positions reverses the direction of flux which tends to be established axially through the armature by said source.

2. A magnetic device, comprising, in combination, a stator having a source of magnetomotive force and pole piece means coupled with said source and defining first and second pole tips, the first pole tips being of like polarity, the second pole tips being of like polarity but of opposite polarity with respect to the first pole tips, the first and second pole tips being spaced apart in a first direction, the pole tips of like polarity being spaced from each other in a second direction transverse to said first direction, an elongate armature pivoted for rotation about its longitudinal axis lying in said second direction, the armature having first and second projections spaced apart along the axis and extending radially relative to said axis, said projections being angularly phased about said axis such that as the armature is rotated between two angular positions, one projection alternately engages first and second pole tips and the other projection alternately engages the second and first pole tips, respectively, whereby rotation of said armature between said two positions reverses the direction of flux which tends to be established axially through the armature by said source.

3. A magnetic device comprising, in combination, a stator having first and second pole tips spaced apart in a first direction, an elongate armature pivoted for rotation about its longitudinal axis lying transverse to said first direction, said armature having first and second projections spaced apart along said axis and extending radially relative to said axis, said projections being angularly phased about said axis such that as the armature is rotated between two angular positions one projection alternately engages said first and second pole tips and the other projection alternately engages said second and first pole tips, respectively, a first source of magnetomotive force in said stator for oppositely polarizing said pole tips, and a second source of magnetomotive force coupled with the armature for oppositely polarizing the first and second projections, one of the sources of magnetomotive force being controllable for reversing the polarity of the magnetomotive force whereby to effect pivoting of the armature.

4. The invention set forth in claim 3 wherein the second source of magnetomotive force includes a coil for reversing the magnetic polarity at the projections to effect pivoting of the armature.

5. The invention set forth in claim 3 wherein the first source of magnetomotive force includes a coil for reversing the polarity at the pole tips whereby to effect pivoting of the armature.

6. A magnetic device comprising, in combination, a stator having pole pieces with first and second pole tips spaced apart in a first direction, the stator also having a permanent magnet polarized in a direction through its thinnest dimension and engaging the pole pieces to oppositely polarize the first and second pole tips, an elongate armature pivoted for rotation about its longitudinal axis lying transverse to said first direction, said armature having first and second projections spaced apart along said axis and extending radially relative to the axis, said projections being angularly phased about said axis such that as the armature is rotated between two angular positions one projection alternately engages said first and second pole tips and the other projection alternately engages said second and first pole tips, respectively, whereby rotation of said armature between said two positions reverses the direction of flux which tends to be established axially through the armature by said magnet.

7. A magnetic device comprising, in combination, a stator having a permanent magnet polarized in a direction through its thinnest dimension, and said stator also having flat pole pieces spaced apart by the thinnest dimension of the permanent magnet and engaged with the magnet and being oppositely polarized thereby, said oppositely polarized pole pieces having first and second pole tips, respectively, spaced apart in a first direction, an elongate armature pivoted for rotation about its longitudinal axis lying transversely to said first direction, said armature having first and second projections spaced apart along said axis and extending radially relative to said axis, said projections being angularly phased about said axis such that as the armature is rotated between two angular positions, one projection alternately engages said first and second pole tips and the other projection alternately engages said second and first pole tips, respectively, the projections on the armature being short and of low inertia commensurate with the spacing between the pole pieces and the first and second pole tips and the thinnest dimension of the permanent magnet, whereby to minimize the effect of inertia of the armature as the same rotates between the two positions, at which positions the direction of flux in the armature is reversed.

8. The invention set forth in claim 7 and including a controllably reversible source of magnetomotive force coupled with the armature for reversing the polarization at the first and second projections and thereby effecting pivoting of the armature.

9. A polarized relay comprising, in combination, a stator part and an armature part forming a magnetic circuit, means mounting said parts for relative movement to open and close an air gap therebetween, one of said parts including a permanent magnet of non-conductive material and two pole pieces of conductive material, the other of said parts being made of conductive material, and a second controllable source of magnetomotive force associated with said other part, said pole pieces forming electrical terminals which are electrically connected and disconnected when said air gap is opened and closed.

10. A polarized relay comprising, in combination, a stator part and an armature part forming a magnetic circuit, means mounting said parts for relative movement to open and close an air gap therebetween, one of said parts including a permanent magnet of non-conductive material and a plurality of pole pieces of conductive material, at least a pair of said pole pieces being of like polarity in the magnetic circuit and being in insulated relation with respect to each other, the other of said parts being made of conductive material, and a second controllable source of magnetomotive force associated with the other part, said pole pieces forming electrical terminals which are electrically connected and disconnected when said air gap is opened and closed.

11. A polarized relay comprising, in combination, a stator part and an armature part forming a magnetic circuit, means mounting said parts for relative movement to open and close an air gap therebetween, one of said parts including a permanent magnet of non-conductive material and a plurality of pole pieces of conductive material, the other of said parts being made of conductive material and arranged for alternately engaging certain of said pole pieces as the parts are moved relative to each other, and a second controllable source of magnetomotive force associated with said other part for producing relative movement between the parts, and said pole pieces forming electrical terminals which are electrically connected and disconnected when said air gap is opened and closed.

References Cited in the file of this patent

UNITED STATES PATENTS

| | | |
|---|---|---|
| 2,419,301 | Tragesser | Apr. 22, 1947 |
| 2,767,279 | Hall | Oct. 16, 1956 |
| 2,888,533 | Koda et al. | May 26, 1959 |
| 2,913,639 | Coppola | Nov. 17, 1959 |
| 2,931,872 | Sprando | Apr. 5, 1960 |
| 2,935,585 | Holcombe | May 3, 1960 |
| 2,941,130 | Fischer et al. | June 14, 1960 |